United States Patent
Zeleznikar (10) Patent No.: US 8,528,012 B2
(45) Date of Patent: Sep. 3, 2013

(54) INTERACTIVE REMOTE CONTROL SYSTEM AND METHOD

(75) Inventor: Alan R. Zeleznikar, Oceanside, CA (US)

(73) Assignee: Motorola Mobility LLC, Libertyville, IL (US)

( * ) Notice: Subject to any disclaimer, the term of this patent is extended or adjusted under 35 U.S.C. 154(b) by 75 days.

(21) Appl. No.: 13/225,950

(22) Filed: Sep. 6, 2011

(65) Prior Publication Data

US 2013/0057765 A1    Mar. 7, 2013

(51) Int. Cl.
*H04H 60/33* (2008.01)

(52) U.S. Cl.
USPC ............... 725/13; 725/10; 725/37; 725/133; 725/141; 725/153; 348/734; 348/569

(58) Field of Classification Search
None
See application file for complete search history.

(56) References Cited

U.S. PATENT DOCUMENTS

| | | | |
|---|---|---|---|
| 5,327,160 A | 7/1994 | Asher | |
| 5,537,152 A * | 7/1996 | Ishikawa | 725/56 |
| 5,604,544 A * | 2/1997 | Bertram | 348/601 |
| 5,691,778 A * | 11/1997 | Song | 725/59 |
| 5,737,028 A * | 4/1998 | Bertram et al. | 725/37 |
| 5,936,611 A * | 8/1999 | Yoshida | 345/158 |
| 6,005,563 A | 12/1999 | White et al. | |
| 6,501,516 B1 * | 12/2002 | Clapper | 348/734 |
| 6,822,698 B2 * | 11/2004 | Clapper | 348/734 |
| 7,607,156 B2 | 10/2009 | Shintani et al. | |
| 7,880,813 B2 * | 2/2011 | Nakamura et al. | 348/569 |
| 8,294,831 B2 * | 10/2012 | Pal | 348/734 |
| 8,348,145 B2 * | 1/2013 | Pratt | 235/375 |
| 2001/0019367 A1 * | 9/2001 | Walton et al. | 348/734 |
| 2003/0011718 A1 * | 1/2003 | Clapper | 348/734 |
| 2004/0004630 A1 | 1/2004 | Kalva et al. | |
| 2005/0155081 A1 | 7/2005 | Chiou | |
| 2008/0055245 A1 | 3/2008 | Migliacio et al. | |
| 2009/0167508 A1 | 7/2009 | Fadell et al. | |
| 2009/0243909 A1 | 10/2009 | Reams | |
| 2009/0245803 A1 | 10/2009 | Garner et al. | |

(Continued)

FOREIGN PATENT DOCUMENTS

| | | |
|---|---|---|
| DE | 19920162 A1 | 11/2000 |
| EP | 2045789 A2 | 4/2009 |
| WO | 01/39147 A1 | 5/2001 |

OTHER PUBLICATIONS

PCT Search Report & Written Opinion, RE: Application #PCT/US2012/053945, Jan. 17, 2013.

(Continued)

*Primary Examiner* — Jason J Chung (57) ABSTRACT

A method and system for controlling operation of one or more electronic devices of an audio-video system with a separate remote controller via a feedback mode of operation are provided. A command code signal is received with a receiver of a signal processing electronic device which interprets the command code signal to determine a particular action being requested. Thereafter, a request for feedback is generated in at least one of a visual form or an audible form for purposes of confirming the particular action being requested before the action is actually executed. If appropriate feedback via a further communication is received with the receiver of the signal processing electronic device within a predetermined time period following the request for feedback, the action is performed and executed by the signal processing electronic device. Otherwise, no action is executed by the signal processing electronic device.

10 Claims, 8 Drawing Sheets

(56) References Cited

U.S. PATENT DOCUMENTS

| | | | |
|---|---|---|---|
| 2009/0245804 A1 | 10/2009 | Garner et al. | |
| 2010/0095346 A1* | 4/2010 | Pal | 725/151 |
| 2010/0149432 A1 | 6/2010 | Roberts et al. | |
| 2010/0165196 A1 | 7/2010 | Bailey et al. | |
| 2011/0037609 A1 | 2/2011 | Kim et al. | |
| 2011/0085083 A1* | 4/2011 | Friedlander | 348/563 |
| 2011/0122317 A1* | 5/2011 | Chen | 348/563 |
| 2011/0140847 A1 | 6/2011 | Schafer et al. | |
| 2011/0304778 A1* | 12/2011 | Roberts et al. | 348/734 |

OTHER PUBLICATIONS

Thinkflood, Inc., "RedEye User Manual for Software Version 2.12.0", 2011.

T. Ogasawara, "Dijit Universal TV Remote Control for iPhone Now Shows Which TV Shows Facebook Friends Like", SocialTimes.com, dated Aug. 12, 2011.

Dijit Media, Inc., "App News: YouTube, Check-Ins, and More!", Dijit Blog (available at blog.dijit.com/2011/08/30/our-latest-app-update-now-with-youtube-check-ins-and-more), dated Aug. 30, 2011.

* cited by examiner

FIG. 8

INTERACTIVE REMOTE CONTROL SYSTEM AND METHOD

FIELD

A system and method for remotely controlling operations of electronic audio-video devices are described.

BACKGROUND

A remote control device, or remote controller, is often used to provide convenient control of operations of a separate electronic device or devices or system of electronic devices from a remote location. For purposes of example, a hand-held, battery-operated remote controller is often used to control operations of televisions, set top boxes (STBs), digital video recorders (DVRs), consumer premises equipment (CPE), and various other home or consumer electronic devices which may be used for receiving, rendering, recording and/or playing audio, video, media content and the like.

In a typical arrangement, a hand-held remote controller transmits a wireless signal, such as an infrared (IR) signal, that includes embedded command codes to a remote control unit of one or more electronic devices to be controlled. The infrared signal propagates to the equipment to be controlled and is detected and decoded using an infrared (IR) detector and signal processing circuitry of the remote control unit of the one or more electronic devices to be controlled. Accordingly, wireless remote control systems provide the convenience of remote operation without the need to directly engage the electronic devices to be controlled and without the need to hard wire the remote controller to the equipment being controlled.

Remote control devices provide the primary mechanism by which consumers interact with their electronic equipment, such as their home entertainment equipment. However, since operations of devices to be controlled are expanding and becoming more complex and since more and varied devices are being added to home entertainment systems and/or networks, the complexities with respect to using remote controllers are increasing. In addition, the typical remote control device has significantly more keys, features, and functions than the typical front panels of the pieces of equipment over which control is being applied. Further, the general requirement that remote control devices be hand-held necessarily requires that their physical design be small, compact, and lightweight thereby causing keys, push-buttons, and like actuation mechanisms provided on the remote control devices to be provided in densely packed arrays. The above factors tend to make using remote control devices difficult.

SUMMARY

This disclosure describes a method of controlling operation of one or more electronic devices with a separate remote controller via a feedback mode of operation. A command code signal is received with a receiver of a signal processing electronic device which interprets the command code signal to determine a particular action being requested. Thereafter, a request for feedback is generated in at least one of a visual form or an audible form for purposes of confirming the particular action being requested before the action is actually executed. If appropriate feedback via a further communication is received with the receiver of the signal processing electronic device within a predetermined time period following the request for feedback, the action is performed and executed by the signal processing electronic device. Otherwise, no action is executed by the signal processing electronic device despite the initial receipt of the command code signal.

This disclosure also describes a signal processing electronic device for use in receiving and rendering multimedia content via a display monitor. The device has a remote control unit with a receiver for receiving command code signals transmitted from a separate remote controller and at least one signal processing unit for interpreting the command code signals received by the receiver. The signal processing unit has software that is configured to determine an action being requested by one of the command code signals and that is configured to generate a request for feedback in at least one of a visual form and an audible form for confirmation of the action being requested. The software of the signal processing unit is also configured to cause the action to be executed only after appropriate feedback via a further communication is received with the receiver of the signal processing electronic device.

Yet further, this disclosure describes a remote controller for controlling operation of a separate electronic device. The remote controller has a body with a control interface provided by an array of keys including at least one of a soft key displayed on a touch screen and a double detent push button hard key. The remote controller also includes a transmitter for generating a signal providing one of a plurality of different command codes. Each of the command codes corresponds to one of the keys and a state of actuation of the key such that different states of actuation of a particular key result in different command codes being transmitted by the transmitter.

BRIEF DESCRIPTION OF THE DRAWINGS

Various features of the embodiments described in the following detailed description can be more fully appreciated when considered with reference to the accompanying figures, wherein the same numbers refer to the same elements.

DETAILED DESCRIPTION

For simplicity and illustrative purposes, the principles of the embodiments are described by referring mainly to examples thereof. In the following description, numerous specific details are set forth in order to provide a thorough understanding of the embodiments. It will be apparent however, to one of ordinary skill in the art, that the embodiments may be practiced without limitation to these specific details. In some instances, well known methods and structures have not been described in detail so as not to unnecessarily obscure the embodiments.

Program providers such as multiple system operators, television networks and stations, cable TV operators, satellite TV operators, studios, wireless service providers, and Internet broadcasters/service providers, among others, operate broadband communication systems enabling the delivery of video/audio programs and like multimedia content to consumers over networks or the like via digital or analog signals. In turn, consumer premises equipment (CPE), such as set-top boxes (STBs), media centers, digital video recorders (DVRs), personal computers, gaming consoles and other electronic devices are adapted to receive, render, record and playback delivered multimedia content typically via an associated display monitor and/or set of speakers. For ease of explanation of one such possible embodiment, an arrangement of a relatively simple home entertainment system is shown in FIG. 4.

Figure 4:
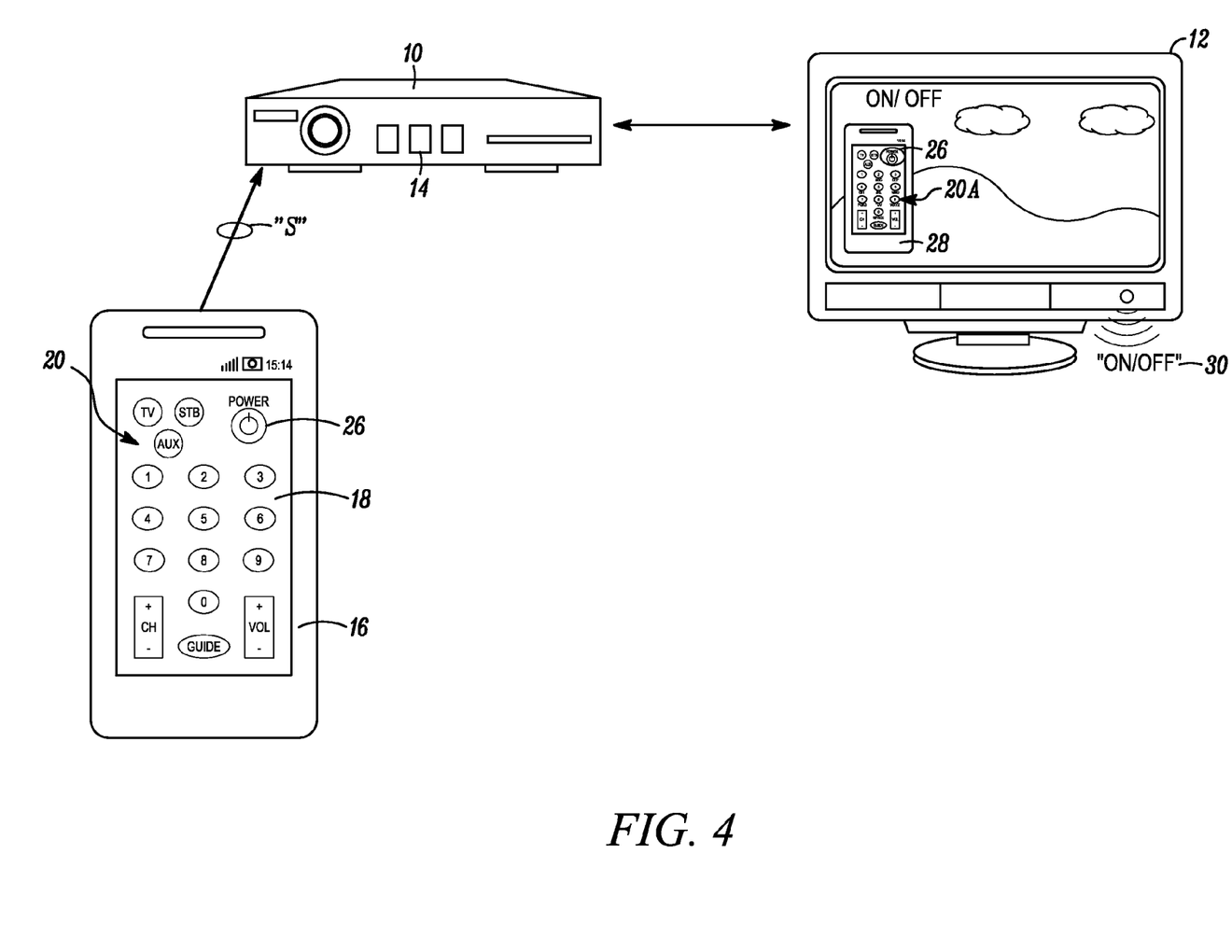
FIG. 4 is an illustration of an example of an audio-video system including a remote controller in accordance with an embodiment.

The STB 10 in FIG. 4 receives and/or stores and renders delivered multimedia content for display on a separate television or monitor 12. The STB 10 may have any type of control panel 14 with buttons or the like provided directly thereon for use by the end user to control operation of the STB 10 and thereby control operation of the television 12 (i.e., tune to a different channel, channel up, channel down, volume up, volume down, display a menu screen, display show listings, etc.). A separate remote controller 16 is typically provided and can also be used to control operation of the STB 10, such as via wireless IR signals "S" (see FIG. 4) or the like. The remote controller 16 shown in FIG. 4 can be in the form of a smartphone, tablet computer or other portable, wireless, handheld device or it can be provided in the form a traditional hand remote control device having a set of hard keys. Accordingly, a user of the television 12 can remotely control the operation of the STB 10 and/or television 12 to change the channel or perform any other operational or set up task permitted.

Figure 1:
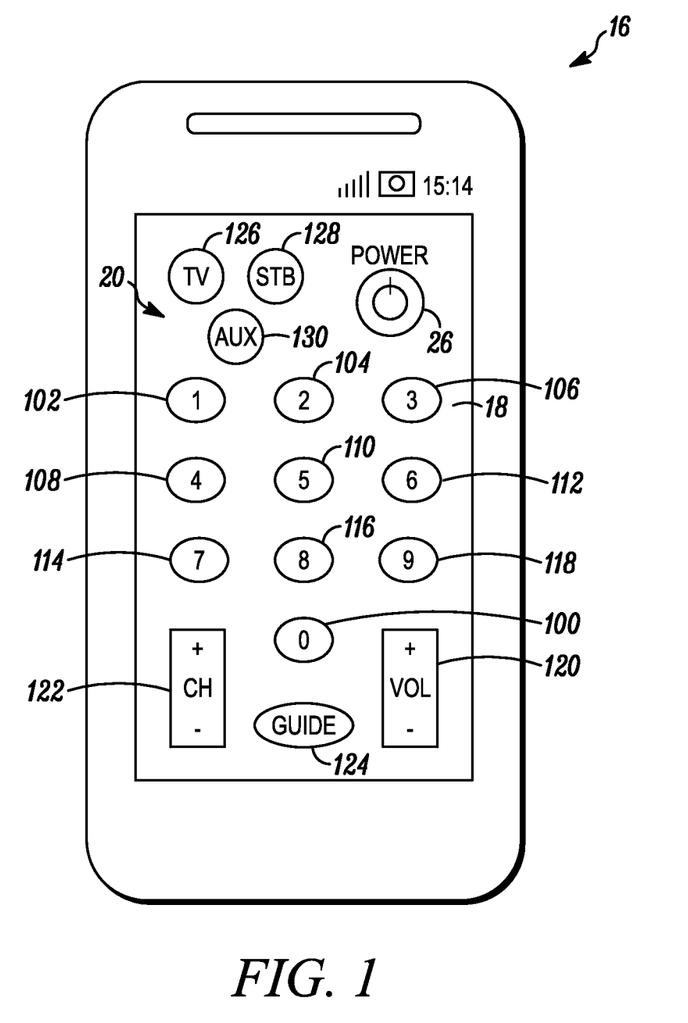
FIG. 1 is a plan view of a smartphone having a touch screen and running an application such that the smartphone provides the function of a remote control device in accordance with an embodiment.

As best illustrated in FIG. 1, a smartphone having a touch screen 18 and running a TV remote control "App" can provide a hand-held remote controller 16 for use in controlling the operation of a STB 10, television 12, or like equipment. The "App" provides a layout 20 of soft keys on the touch screen 18 that can be touched by the user to cause a corresponding action to be taken by the STB 10, television 12, or like targeted device. Solely for purposes of example and not by way of limitation, the layout 20 of soft keys can include a soft key 26 labeled "Power" for use in powering on and off a target device and can include soft keys 100, 102, 104, 106, 108, 110, 112, 114, 116 and 118 that represent keys numbered "0" through "9" for use in entering a channel number. In addition, the layout 20 can include a soft key 120 providing volume up and down control, a soft key 122 providing channel up and down control, and a soft key 124 labeled "Guide" for use in viewing a listing of shows or the like. Still further, the layout 20 can include a soft key 126 labeled "TV", a soft key 128 labeled "STB", and a soft key 130 labeled "Aux" for selecting a target device to be controlled. The arrangement and type of soft keys shown in FIG. 1 is merely provided for purposes of example, and it should be understood that any number, arrangement, shape, and size of soft keys can be provided in a layout of soft keys and can be used to perform various functions.

Thus, the touch screen 18 is a display screen that displays a layout 20 of soft keys and functions as an input device. The touch screen 18 may be sensitive to pressure or the like requiring a user to touch one of the displayed soft keys for a command to be sent to the STB 10, television 12, or like targeted equipment. The touch screen 18 may be provided in the form of a resistive touch screen panel, a surface ultrasonic wave touch screen panel, a capacitive touch screen panel, or any other form of display panel that interaction by a user is accomplished via the touching of a display.

Figure 2:
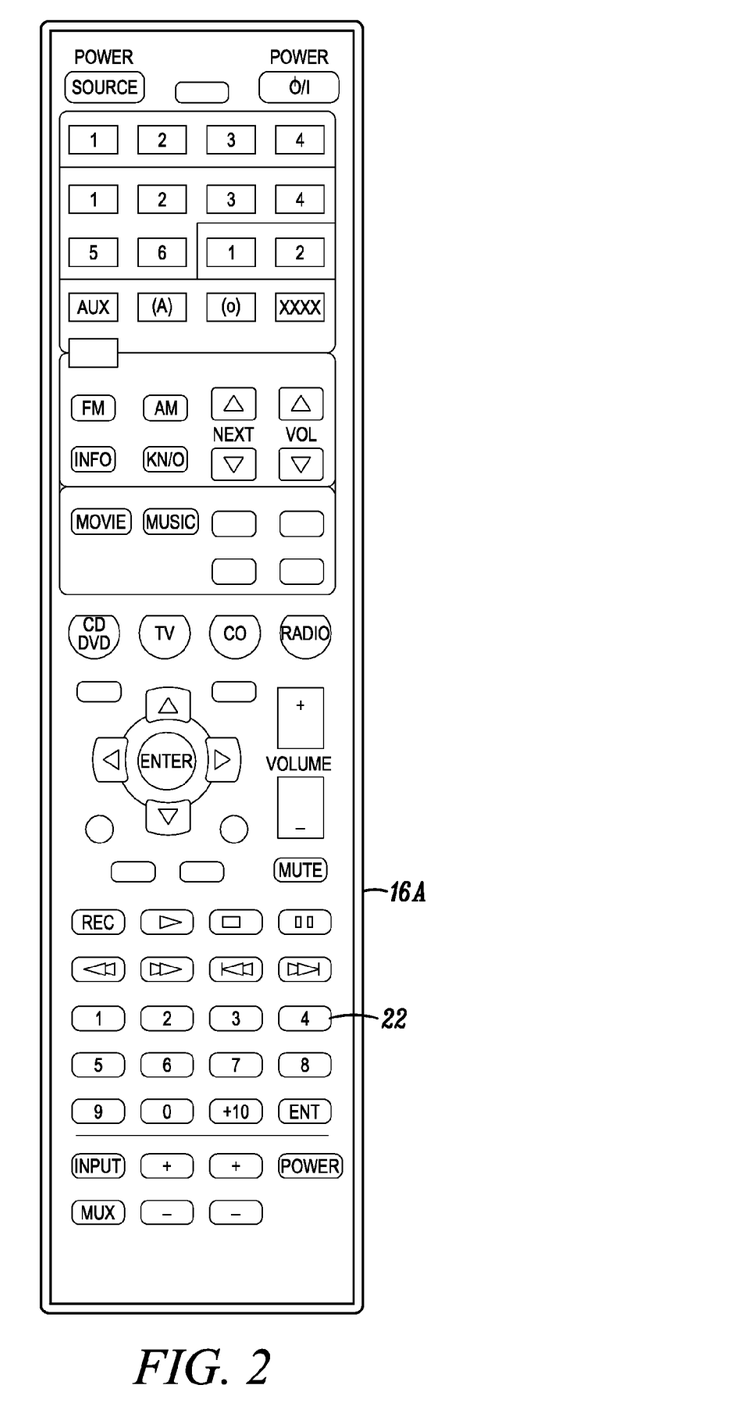
FIG. 2 is a plan view of an example of a remote control device having an array of hard keys in accordance with an embodiment.
Figure 3:
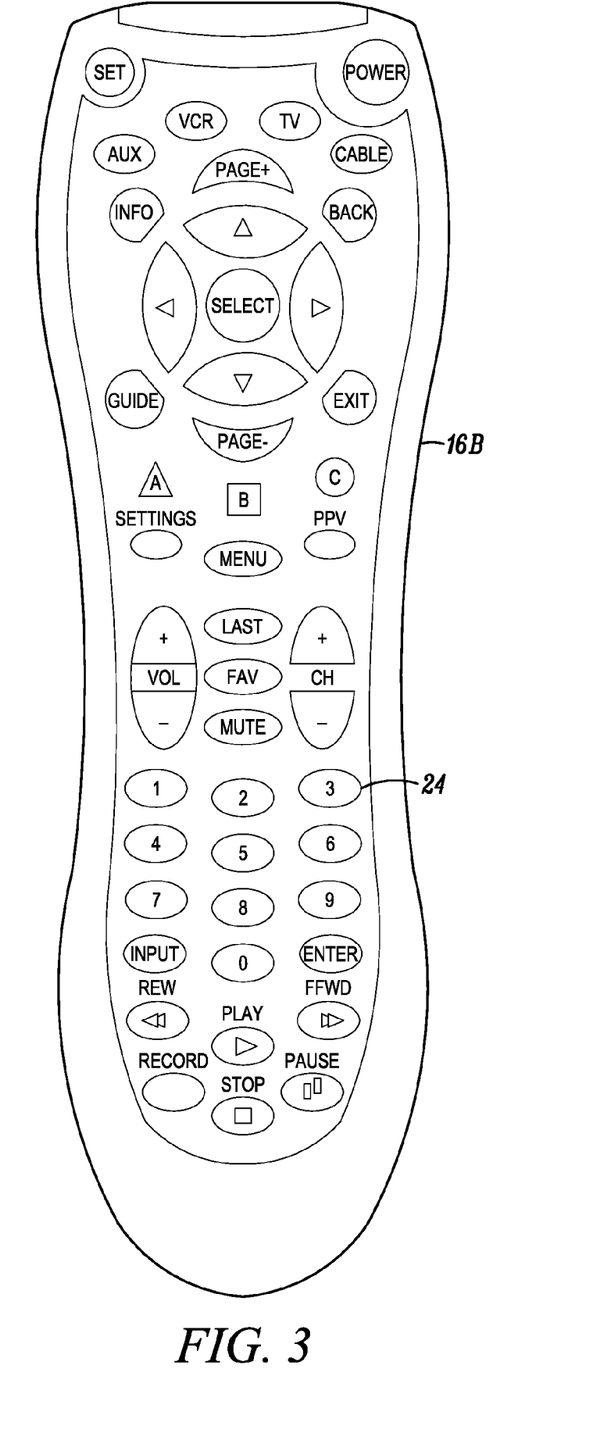
FIG. 3 is a plan view of another example of a remote control device having an array of hard keys in accordance with an embodiment.

As best illustrated in FIGS. 2 and 3, a hand-held remote controller can be provided in various other configurations such as shown for remote controllers 16a and 16b which are in the form of dedicated TV remote control devices. In FIG. 2, the remote controller 16a has a layout of hard keys which can be provided as depressible push-buttons. Solely for purposes of example, remote controller 16a has a hard key 22 that is labeled with the number "4". This hard key 22 may be depressed, for instance, when entering a desired channel number which includes the number "4". For purposes of simplicity, the remaining hard keys shown in FIG. 2 are not discussed in further detail. It should be understood that each of the other hard keys are provided with respect to performing other functions that are well known in the art of television remote controllers.

Similar to the remote controller 16a shown in FIG. 2, the remote controller 16b shown in FIG. 3 also has a layout of hard keys which can be provided as depressible push-buttons. Solely for purposes of example, remote controller 16b has a hard key 24 that is labeled with the number "3". This hard key 24 may be depressed, for instance, when entering a desired channel number which includes the number "3". For purposes of simplicity, the remaining hard keys shown in FIG. 3 are not discussed in further detail. It should be understood that each of the other hard keys are provided with respect to performing other functions that are well known in the art of television remote controllers. However, it is clear from comparing the layouts of keys shown in FIGS. 1-3 that layouts can be significantly different and that there is no limit to the arrangement, number, shape and size of keys and types of functions that may be provided on a device used as a remote controller.

Of course, the above discussed remote controllers represent just a few examples, and a remote controller, the layout of keys, and the type of keys can be provided in any shape or form and include display screens, touch screens, push buttons, and the like. Remote controllers, such as the above referenced remote controllers 16, 16a and 16b, are typically of a size that can be readily held in a user's hand or supported on a user's lap and are relatively lightweight. In addition, remote controllers typically have a large number of keys, hard or soft, or like actuating mechanisms which enable different functions and even different electronic equipment to be controlled. Since there are typically many relatively small keys located on the relatively small and compact remote controllers, 16, 16a and 16b, the keys are typically positioned closely together in densely packed arrays. Descriptive indicia is provided in the form of symbols, numbers, letters, abbreviated words or the like on or adjacent each key and is also typically provided in a relatively small font size. In addition, some keys may perform more than one function and may be labeled with multiple different descriptive indicia. Thus, for some users, distinguishing between keys on the remote controllers 16, 16a and 16b may be difficult due to the small physical size of the keys and descriptive indicia of the keys, the dense packing of the keys, the large size of the finger of the user relative to the size of the keys, and the fact that some keys perform multiple functions depending upon the device being controlled and what other keys have been previously activated. These problems are further exacerbated when the remote controller is used in dim or low light conditions.

The remote controller 16 and STB 10 in FIG. 4 addresses the above issues via a user-friendly feedback mode of operation. The system and method described herein provide a feedback process in which a selected operation is first identified with a visual graphic and/or an audible signal and is only caused to be performed after completion of a confirmation step. In this way, mistakes of actuating a key and causing an unwanted control operation to occur can be avoided.

By way of example, when a user contacts or otherwise actuates to some extent a particular key 26 (in this example, the "Power" or "On/Off" key which is circled in FIG. 4) on the remote controller 16, the remote controller causes a command code signal to be transmitted in some form via some form of communication path to the STB 10. This path may be through network connections or via a wireless signal. Upon receiving and interpreting the signal, a selected operation being requested is identified by a signal processing unit of STB 10 (i.e., the STB determines the operation desired based on which key on the remote controller 16 was actuated, touched, or the like). However, before performing the selected operation, the STB 10 provides feedback to the user to ensure that the selected operation is the actual operation desired by the user. After the feedback is provided to the user, the user then confirms or rejects the operation. For instance, if the operation identified by the STB 10 is desired, the user may need to actuate or re-actuate the previously selected key on the remote controller 16 or a key pre-designated as an "accept" key. Alternatively, if the operation identified by the STB 10 during the feedback mode is not desired or was initially selected by mistake, the user may prevent the operation from being performed by pressing a different key on the remote controller 16, a key pre-designated as a "reject" key, or may avoid actuating any key to permit the feedback operation to lapse after a predetermined time period.

Figure 5:
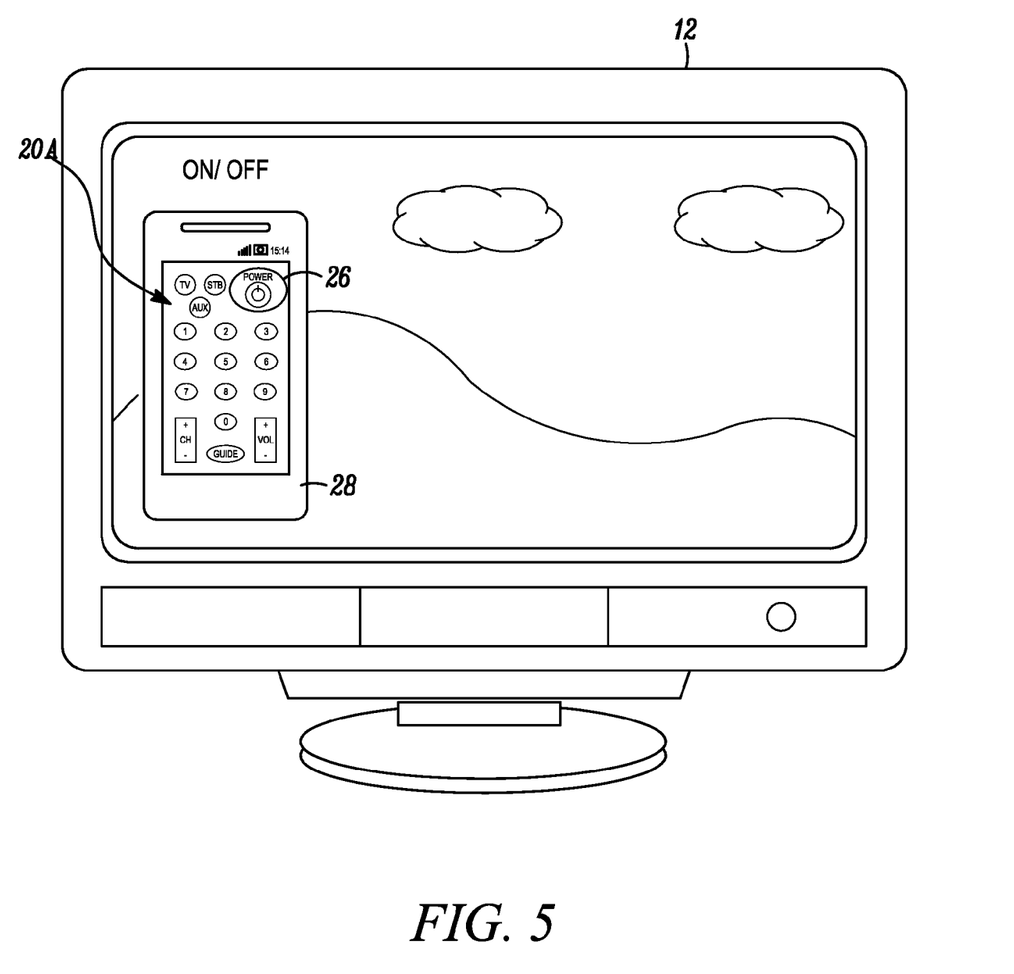
FIG. 5 is a graphical display on the monitor shown in FIG. 4 with respect to a feedback mode of operation in accordance with an embodiment.

The feedback may be in the form of a graphic image 28 and/or an audible sound 30 and/or both. Upon receiving an initial command code from the remote controller 16, the STB 10 creates, selects, formats or otherwise sends a graphic image signal or file to the monitor 12 for being displayed on the monitor 12. For example, as shown in FIG. 5, a graphic image 28 representing the likeness of the remote controller 16 is displayed on at least part of the screen of the monitor 12. In the specific example provided by FIG. 5, the remote controller graphic image 28 is placed along the left margin of the monitor 12 and overlays the program being displayed on the monitor 12. For instance, if the "On/Off" button 26 is touched, actuated or semi-actuated on remote controller 16 by the user, the STB 10 sends a graphic image file or signal for display on the monitor 12 such that an image or visual representation 28 of the remote controller 16 is displayed on the monitor 12 with the "On/Off" button circled or otherwise highlighted or identified in the image 28 and with relatively large descriptive indicia (in this example, "ON/OFF") displayed on the monitor 12 corresponding to the key 26 initially activated, touched or the like.

In addition, or as an alternative to the above described visual graphic image 28, the STB 10 can instruct the monitor 12 to produce an audible signal 30 to be played via a set of speakers of the monitor 12 or connected to the entertainment system. In the example shown in FIG. 4, audible signal 30 is emitted by the speakers of the monitor 12. The audible signal 30 in this example is the words "ON-OFF" being emitted by the speakers.

Given the graphic image 28 and/or the audible signal 30, the user can be sure of the action that will be taken before the action is actually performed and executed. If the user agrees with the action, the user can confirm by pressing the same key (key 26 in the illustrated example) previously actuated or a designated confirmation key. Alternatively, if the user does not want the identified action performed, the user can press a different key than the one previously selected, can press a designated cancelation key, or can resist pressing a key within the time period allotted for successful confirmation. In the above manner, feedback is provided to the user permitting the user to confirm the proper selection, or cancel an undesired selection, before any command is actually executed by the STB 10 or monitor 12.

The graphic image 28 displayed during the feedback mode may be in many different forms. A contemplated example as shown in FIG. 5 is an actual/identical visual representation of the remote controller 16. As an alternative, the representation can be provided as a simple outline of a remote controller thereby providing a more generalized representation. For the purpose of providing a representation that corresponds to the particular remote controller being used, the STB 10 can have a database of information stored in memory relative to numerous remote controllers that might be used to control operation of the STB 10. The STB 10 may also be able to be provided with such information from a program provider network, communications from the remote controller itself, information provided during a set up mode, or the like. For instance, during setup, the STB 10 may acquire information concerning the remote controller being used and request graphic information/key arrangement from a source on the network to update its database of remote controller configurations. The ability to provide a layout 20a of keys on the graphic image 28 that is substantially the same as the layout 20 of keys on the actual remote controller 16 being used provides a user-friendly means of quickly confirming the key initially actuated so that the key can be pressed again for confirmation purposes.

In some contemplated embodiments of the above referenced system, the remote controller can be of a standard design requiring the same soft or hard key or button to be fully depressed, touched, or otherwise actuated for purposes of initially sending a command code signal and then for sending feedback by way of a second identical command code signal for confirming the initial command and to have the command executed. However, according to other contemplated embodiments, the remote controller may be provided with additional features to enhance operation of the remote controller in the above referenced feedback system. In this case, the initial signal sent may not require a soft or hard key to be "fully" actuated, and the feedback process may be intentionally bypassed by "fully" actuating a soft or hard key. Thus, if the user wants to operate in a feedback mode of operation, a soft or hard key may only be required to be touched or tapped one time or semi-depressed so that the user can positively know what action will occur should the key be "fully" actuated. However, if the user knows the action performed by "fully" actuating a key, the user can proceed to fully actuate the key (such as by touching the key twice in rapid succession or by fully depressing the key) to have the action executed without requiring the feedback step.

By way of example, the remote controller may have some form of sensor such as provided by a resistive-sensitive, capacitive-sensitive, or ultrasonic wave-sensitive touch screen to detect when a soft key, such as soft key 26, is touched by a fingertip. Thus, if the soft key 26 is touched or tapped one time, a command code signal in a feedback mode is generated for the specific key tapped and sent by the remote controller to the STB, and the STB seeks instructions in the feedback mode of operation to confirm the desire to proceed with, or cancel, the action as discussed above. For instance, if the action that will be performed by the key touched is desired, the user may simply touch the soft key two times in rapid succession (i.e., two taps) to confirm execution of the command during the feedback process. Alternatively, the user may initially tap the key twice to proceed without feedback.

As another alternative, the hard keys of the remote controller, 16a and 16b, such as hard keys 22 or 24, can be of a so-called "double detent" type of mechanical push-button in which a command requiring feedback is initially selected by partially pressing the button (depressing the button about half-way to a first detent), and after feedback is requested, the user fully depresses the button (to a second detent) to cause the command to be executed and performed. Alternatively, the user may initially fully depress the button to the second detent to proceed without feedback. Of course, other mechanisms for sensing a selected button and for confirming or rejecting the initially selected button during the feedback operation can be used. In addition, the remote controller may provide a toggle switch or like mechanism to permit the user to toggle between the feedback mode of operation discussed above and a regular mode of operation in which there is no feedback. Thus, different users can select between the feedback approach and an approach without feedback.

In addition to the above referenced soft keys, hard keys, sensors, and push buttons, the remote controller may also be provided with an accelerometer. The accelerometer could be used to activate the remote controller from a sleep-state or could be used to toggle between the feedback mode of operation discussed above and a regular mode of operation in which there is no feedback. For example, for purposes of conserving battery power, the remote controller can automatically power off or can be provided in a "sleep" mode in which only a limited amount of components are powered. When the user shakes the remote controller, the accelerometer senses the movement and powers "on" the remote controller. Alternatively, the accelerometer can be used to place the remote controller in a feedback mode of operation following a rapid shake of the remote controller.

Figure 7:
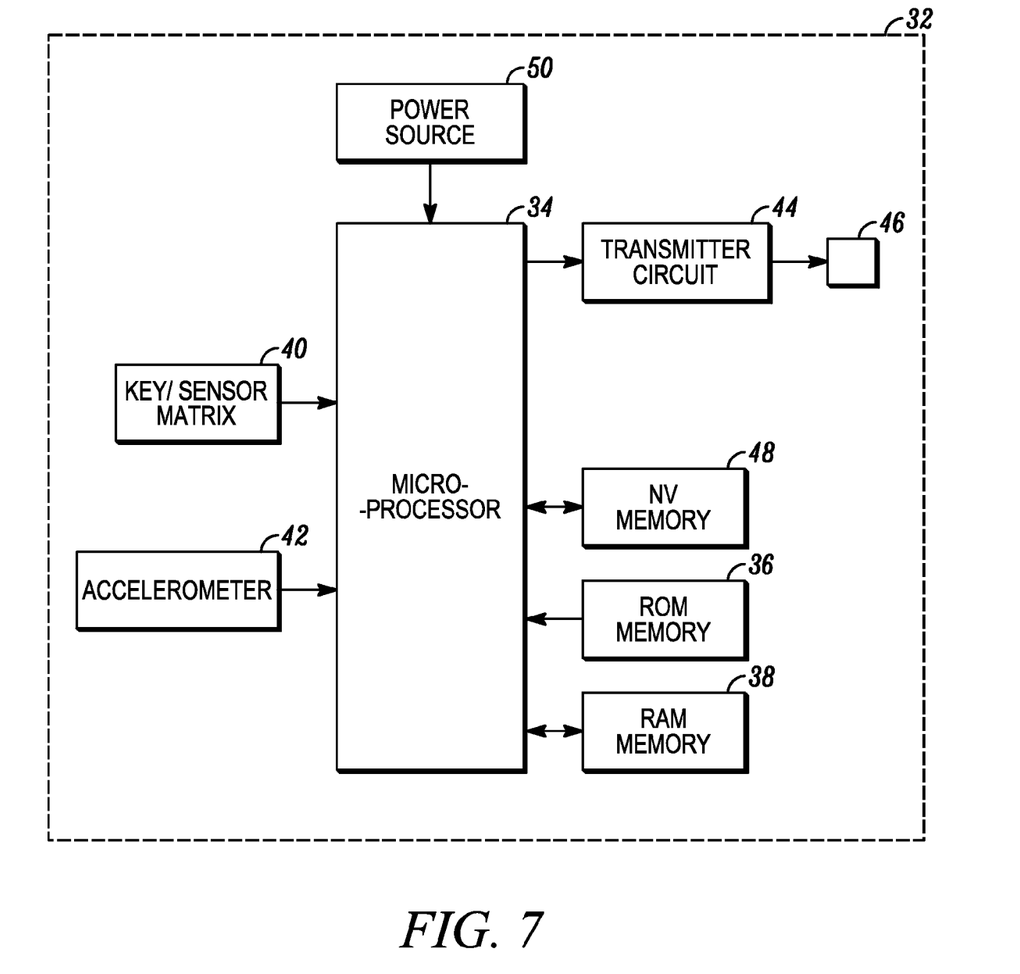
FIG. 7 is a schematic diagram of a signal processing electronic device, such as a remote controller, in accordance with an embodiment.

Referring to an example of the architecture for a remote controller 32 as provided in FIG. 7, the remote controller 32 may have a microprocessor 34 coupled to ROM and RAM memory 36 and 38, a key/sensor/button matrix 40 (e.g., hard keys, mechanical double detent keys, soft keys such as provided by a touch screen, or some combination thereof), an accelerometer 42 (i.e., to sense rapid shaking of the remote controller to activate the remote controller or activate a feedback mode of operation), a transmitter circuit 44 and associated IR emitter 46, a non-volatile read/write memory 48, and a power source 50 such as a battery. Some or all of the memories 36, 38 and 48 may include executable instructions that are intended to be executed by the microprocessor 34 to control the operation of the remote controller 32 as well as data that serves to define control protocols and command values to operational software. In this manner, the microprocessor 34 may be programmed to control the various electronic components within the remote controller, e.g., to cause the transmission of an appropriate command code signal if a key is touched once or twice, semi-pressed, or fully actuated and to send an appropriate confirmation signal during a feedback mode of operation to accept or reject the graphically displayed action, and the like.

All or part of the non-volatile read/write memory 48, for example an EEPROM, battery-backed up RAM, FLASH, Smart Card, memory stick, or the like, may additionally be used to store setup data and parameters as necessary, such as information concerning the feedback graphic image file, feedback audio file, or key arrangement to be transferred to and/or stored by the STB for this particular remote controller 32.

The remote controller 32 is adapted to sense user interaction with the keys beyond simple full actuation of a mechanical key. For example, when a soft key is touched one time or a double detent mechanical key is depressed to a first detent, the key 42 causes appropriate instructions within the program memory to be executed. Likewise, when a key 42 is fully actuated (i.e. a soft key is rapidly tapped twice or a double detent mechanical key is depressed to a second detent), the key 42 causes appropriated instructions within the program memory to be executed which are different than those referenced above for partial activation. For instance, partial activation may be an instruction requesting feedback and full actuation may correspond to an instruction requesting execution of a command currently assigned to the actuated key and the currently assigned device mode. In this manner, a particular command code signal can be transmitted to an intended target device, such as the STB 10, in a format recognizable by the intended target device. Accordingly, the remote controller 32 may be a so-called universal remote controller that is adapted to issue commands to a multiplicity of electronic devices of different types and/or manufacture.

For purposes of enabling remote control, the STB 10 or other electronic device to be controlled may include a remote control unit (RCU) including, for instance, a receiver 52 for detecting command code signals transmitted from a remote controller and a central or other processing unit (CPU) 54 for receiving the output of the receiver 52. See FIG. 6. The receiver 52 may be an IR detector capable of receiving IR signals, and the CPU 54 processes the received signals and determines the particular command code received from the remote controller. The processing unit 54 causes the STB 10 to execute the command or request feedback as discussed above.

Figure 6:
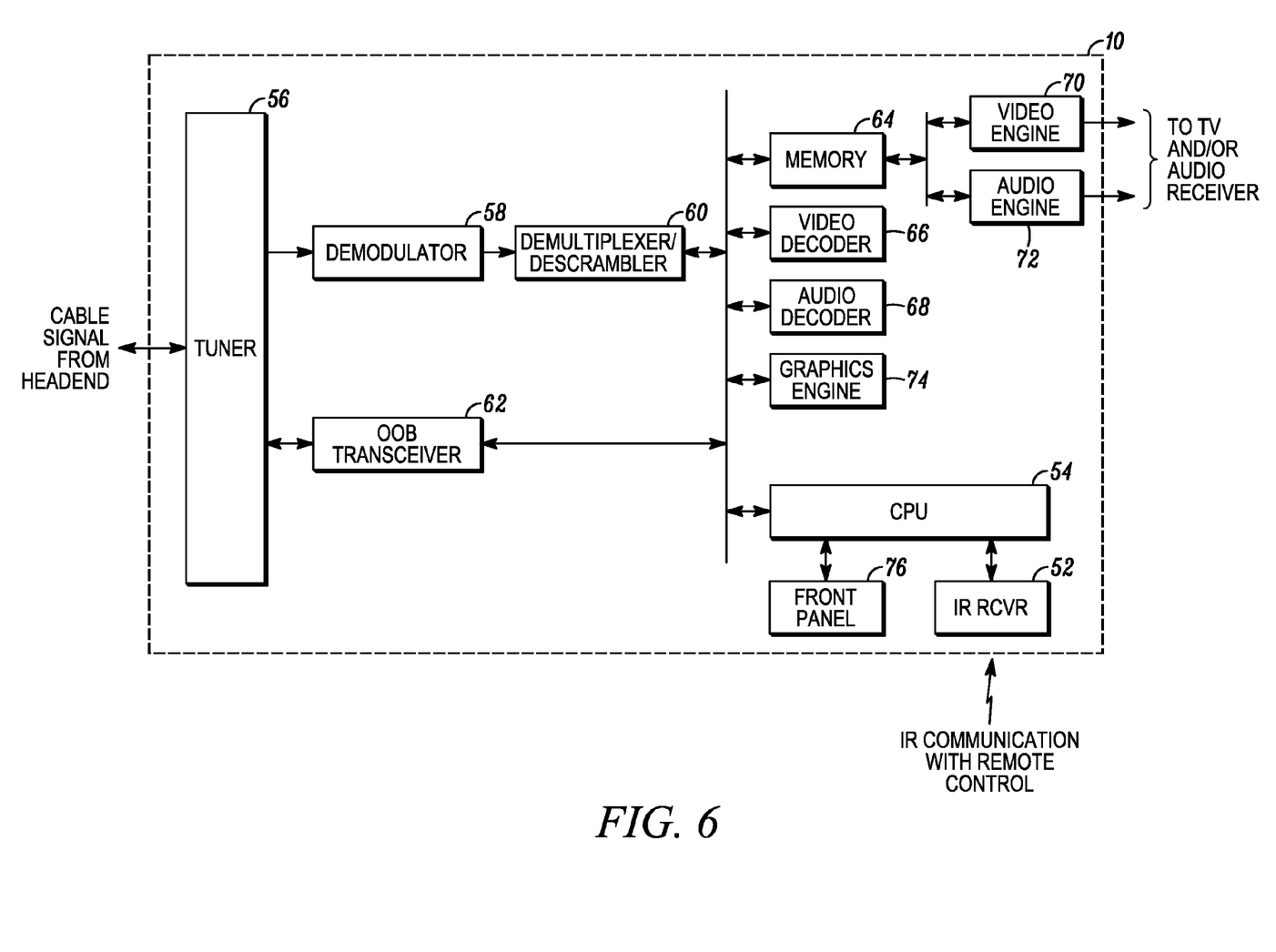
FIG. 6 is a schematic diagram of a signal processing electronic device, such as a set top box (STB) in accordance with an embodiment.

Exemplary architecture for set top box 10 is illustrated in FIG. 6. Such a set top box may include a cable system interface comprising a tuner 56 for selection of a particular signal originating from a cable system head end, a demodulator 58 for demodulating that signal into binary data, a demultiplexer 60 for separating the resulting binary data stream into constituent parts (e.g., MPEG encoded video, AC3 encoded audio, etc.), and an out of band transceiver 62 for transfer of control information, software updates, program guide data, and the like. The operation of the above referenced components is under the control of a processor, such as CPU 54 responsive to an operating program resident in memory 64. Also under the control of the CPU 54 and the operating program, received media data is decoded by video and audio decoders, 66 and 68, and provided to video and audio output engines 70 and 72 for rendering on, for example, television 12. Additionally, a graphics engine 74 may be provided to allow the processor and operating program to display locally-sourced information, e.g., guide data, set up menus, status messages, images for feedback, etc., either overlaid onto, in conjunction with, or in place of the media stream currently being received. For user interface purposes, a front control panel 76 and the remote control communication link receiver 52 are provided.

The memory 64 of the set top box 10 may store software instructions for controlling the functions of the set top box 10 (i.e. an operating program), application programs (e.g., program guides, games, device setup applications, help menus, etc.) which may be permanently retained in the memory or may be transient, e.g., temporarily provisioned via out of band transceiver 62, etc., data for use in such operations (e.g., channel-line up, program guide information, graphic feedback images, etc.), user preference information and settings, and display templates and graphics for menus or messages. Numerous images of different types of remote controllers and associated command definitions for keys may be stored in the memory of the STB. Numerous audio files may also be stored in the memory for providing audible feedback. Additionally, portions of set top box memory 64 may serve as buffers for incoming and outgoing media data streams as they are decoded, processed and output to connected devices.

Software loaded and running in the CPU 54 or another processing unit analyzes signals received by the remote controller and determines if the feedback process discussed above should be implemented. When a remote controller is set to operate with feedback, the software interprets the unique command code signal received from the remote controller relative to the key the user touched, semi-actuated, or fully actuated and sends graphic image file signals to the television 12 to cause a graphic image 28 representing the remote controller and layout and location of keys on the remote controller to be overlaid on the display shown on the monitor 12, such as shown in FIG. 5. The software causes the touched, semi-actuated or actuated key on the remote controller to be highlighted in the graphic image 28, such as by circling or otherwise highlighting the key and by showing descriptive indicia corresponding to the function of the key in a relative large font size that can be easily read by the user. In addition, the software may send mp3 or other types of audio signals to the television 12 such that a description of the function of the key can be announced over the speakers of the television to permit the user to hear the command.

After the above referenced feedback graphic and/or audio is provided by the software, the STB 10 waits for a further command code signal from the remote controller. If the proper command code signal is received, the STB 10 causes the action to be taken and removes the graphic image 28 from the monitor 12. If no signal is received within a time period set within the software or if a command code signal other than an accepted confirmation is received, the STB 10 takes no action relative to the initial command code signal received and eliminates the graphic image 12 from the display. In some instances, the STB 10 may replace the initial image with a new image corresponding to the new key pressed and begin a new feedback operation. Alternatively, the STB may simply reset and be ready to receive a new command code signal from the remote controller to start a new feedback process.

Figure 8:
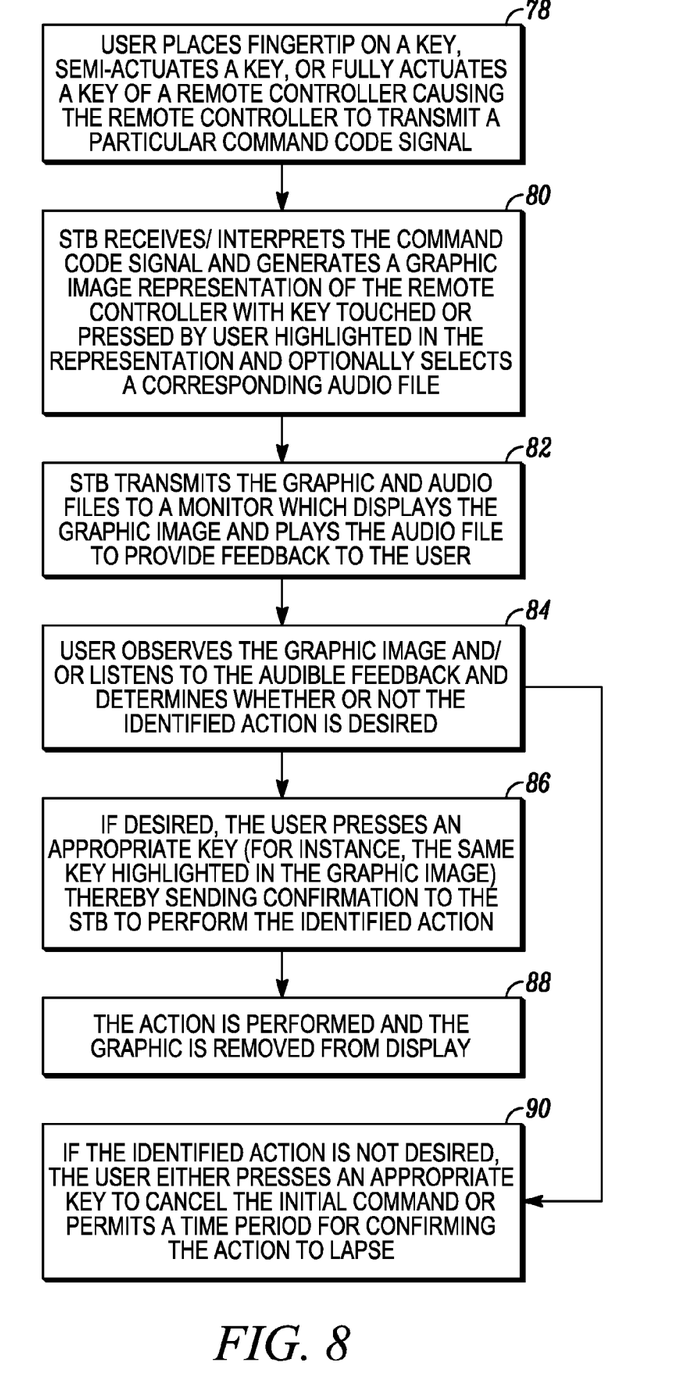
FIG. 8 is a flowchart of process steps for a method of interactively controlling operation of an audio-video system with a remote controller via a feedback mode of operation in accordance with an embodiment.

Referring to FIG. 8, a feedback process is shown via a flowchart. The user decides to control an electronic device of an audio-video system and either places a finger on one of the keys of the remote controller (one tap) or lightly presses the key to a first detent, depending upon the type of keys/sensor/buttons of the remote controller. See step 78. This causes the remote controller to send an appropriate and unique command code signal (corresponding to the function of the key tapped once or semi-depressed to a first detent) to the STB. The STB receives and interprets the command code signal, generates a graphic image corresponding to the remote controller and key touched or pressed in step 78, and selects a corresponding audio file. See step 80. The STB transmits the graphic and audio files to the monitor which displays the graphic image and plays the audio file. See step 82.

The user then observes the graphic image and/or listens to the audible feedback and determines whether or not the identified action is indeed desired. See step 84. If desired, the user presses an appropriate key (for instance, the same key highlighted in the graphic image is tapped twice or depressed to a second detent) thereby sending confirmation to the STB to perform the identified action. See step 86. Thereafter, the action is performed and the graphic is removed from display. See step 88. If the identified action is not desired, the user either presses/touches an appropriate key to cancel the initial command or permits a time period for confirming the action to lapse. See step 90. In this case, the STB does not perform the action and the graphic is removed and possibly replaced with a new graphic depending upon the key actuated as feedback.

The devices, units, modules and storage discussed above can physically be provided on a circuit board or within an electronic device and can include various processors, microprocessors, controllers, chips, disk drives, and the like. It will be apparent to one of ordinary skill in the art that the modules, processors, controllers, units, and the like may be implemented as electronic components, software, hardware or a combination of hardware and software. In addition, although the examples above are directed to a home entertainment system and use of IR remote control signals, the procedure and devices are not limited to such examples. The devices and systems can be any equipment in which wireless control signals are required to be received for a device for purposes of controlling operation of one or more devices. Also, although an STB is discussed above, the device being controlled may be any device including a television and any other consumer device.

While the principles of the invention have been described above in connection with specific devices, systems, and methods, it is to be clearly understood that this description is made only by way of example and not as limitation on the scope of the invention as defined in the appended claims.

I claim:

1. A method of controlling operation of an electronic device of an audio-video system with a separate remote controller, comprising the steps of:
   receiving a command code signal with a signal processing electronic device;
   interpreting the command code signal with the signal processing electronic device to determine an action being requested;
   after said interpreting step, generating a request for a feedback, the request in at least one of a visual form and an audible form to confirm the action being requested, wherein the feedback is a re-transmission of the command code signal;
   wherein when a soft key on a touch screen of the remote controller is tapped one time, the command code signal received during said receiving step is generated, and wherein when the soft key is tapped at least two times in succession, the feedback is generated;
   wherein when a hard key on the remote controller is semi-depressed, the command code signal received during said receiving step is generated, and wherein when the hard key is fully-depressed, the feedback is generated;
   during said interpreting step, in the signal processing electronic device, retrieving an electronic graphic image file corresponding to a particular appearance of the remote controller from a stored database of electronic graphic image files and sending the electronic graphic image file to the display monitor so that the graphic image displayed on the display monitor corresponds to the remote controller from which the control code signal was received; and executing the action after the feedback via a further command code signal received with the signal processing electronic device within a predetermined time period following said generating step, wherein the further command code signal comprises the user confirmation when a selection is a proper selection and the user cancelling the selection when the selection is an undesired selection, before any command is actually executed by a set-top box.

2. The method according to claim 1, wherein said generating step includes displaying on a display monitor of the audio-video system a graphic image of a representation of a remote controller from which the command code signal was received during said receiving step.

3. The method according to claim 2, wherein the graphic image includes a showing of a layout of keys that substantially resembles an actual layout of keys of the remote controller from which the command code signal was received during said receiving step.

4. The method according to claim 3, wherein the action being requested is determined based on a form of actuation of a particular one of the keys in the actual layout of keys of the remote controller, and wherein the graphic image displays the particular one of the keys in a highlighted form on the display monitor so that the action requested is visually perceivable from observation of the display monitor.

5. The method according to claim 4, wherein the feedback required for said executing step is a signal from the remote controller resulting from actuation of the particular one of the keys on the remote controller that is shown in the highlighted form on the display monitor.

6. The method according to claim 2, wherein the signal processing electronic device is selected from the group consisting of a set-top box, a media player, a digital video recorder, a television, a computer, and a gaming console, wherein the display monitor is selected from the group consisting of a television and a display screen of a computer, and wherein said generating step includes emitting from a speaker an audible description of the action.

7. A signal processing electronic device for use in receiving and rendering multimedia content via a display monitor of an audio-video system, comprising:
 a remote control unit having a receiver for receiving command code signals transmitted from a separate remote controller having a touch screen and a hard key;
 the remote control unit further comprising at least one signal processing unit for interpreting the command code signals received by the receiver,
 wherein a command code signal received by the receiver is generated when a soft key on the touch screen of the remote controller is tapped one time, and wherein a feedback is generated when the soft key is tapped at least two times in succession; and
 wherein the command code signal received by the receiver is generated when the hard key on the remote controller is semi-depressed, and wherein the feedback is generated when the hard key is fully-depressed; and
 at least one of said at least one signal processing units having software whereby at least one processor is configured:
  to retrieve an electronic graphic image file corresponding to a particular appearance of the remote controller from a stored database of electronic graphic image files,
  to send the electronic graphic image file to a display monitor so that the graphic image displayed on the display monitor corresponds to the remote controller from which the control code signal was received,
  to determine an action being requested by one of the command code signals,
  to generate a request for the feedback, the request in at least one of a visual form and an audible form for a confirmation of the action being requested, and
  to execute the action after the feedback via a further communication is received with the receiver of the signal processing electronic device, wherein the feedback is a re-transmission of the command code signal, and
 wherein the further command code signal, when a selection is a proper selection, comprises the confirmation, and when the selection is an undesired selection, comprises a user cancellation of the selection before any command is actually executed by a set-top box.

8. The signal processing electronic device according to claim 7, wherein the request for the feedback includes displaying on the display monitor a graphic image of a representation of a remote controller from which a command code signal is received.

9. The signal processing electronic device according to claim 8, further comprising a storage unit in which a database of different electronic graphic image files is stored and is accessible so that an electronic graphic image file corresponding to a particular appearance of the remote controller from which a command code signal is received is displayable on the display monitor.

10. The signal processing electronic device according to claim 8, wherein the graphic image includes a showing of a layout of keys that substantially resembles a layout of keys of the remote controller from which a command code signal is received, and wherein the signal processing electronic device is selected from the group consisting of a set-top box, a media player, a digital video recorder, a television, a computer, and a gaming console.

* * * * *